(12) United States Patent
Patra

(10) Patent No.: US 11,984,999 B2
(45) Date of Patent: May 14, 2024

(54) SMARTER COLLABORATIVE CONFERENCES

(71) Applicant: INTERNATIONAL BUSINESS MACHINES CORPORATION, Armonk, NY (US)

(72) Inventor: Suman Patra, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/942,641

(22) Filed: Sep. 12, 2022

(65) Prior Publication Data

US 2024/0089133 A1    Mar. 14, 2024

(51) Int. Cl.
*H04L 12/18*      (2006.01)
*G06Q 10/1093*   (2023.01)

(52) U.S. Cl.
CPC ..... *H04L 12/1818* (2013.01); *G06Q 10/1095* (2013.01); *H04L 12/1831* (2013.01)

(58) Field of Classification Search
CPC ............ H04L 12/1818; H04L 12/1831; G06Q 10/1095
See application file for complete search history.

(56) References Cited

U.S. PATENT DOCUMENTS

| | | | |
|---|---|---|---|
| 8,885,565 B2 | 11/2014 | Van De Ven | |
| 9,300,811 B2 | 3/2016 | Kaplan | |
| 10,187,432 B2 * | 1/2019 | Katekar | G06F 16/78 |
| 10,397,284 B2 | 8/2019 | Arscott | |
| 2015/0170652 A1 | 6/2015 | Kaplan et al. | |
| 2022/0131943 A1 | 4/2022 | Zhang et al. | |
| 2022/0286312 A1 * | 9/2022 | Tiwari | H04L 12/1822 |
| 2022/0383374 A1 * | 12/2022 | Villaverde Calva | G06Q 30/0617 |

FOREIGN PATENT DOCUMENTS

JP         2006197251 A   *   7/2006

OTHER PUBLICATIONS

Global Market Insights (GMI), Report ID: GMI3003, Published Date: Oct. 2021, 7 pages, https://www.gminsights.com/industry-analysis/video-conferencing-market.

* cited by examiner

*Primary Examiner* — Michael A Keller
(74) *Attorney, Agent, or Firm* — Jordan T. Schiller

(57) ABSTRACT

A computer-implemented method for automatically recommending an online meeting reconnection time for one or more online meeting participants that are disconnected. The method collects disconnection information for one or more online meeting participants over time as historical data. The method constructs a predictive model for the one or more online meeting participants based on the historical data and predicts a reconnection time for the one or more online meeting participants based on the predictive model. The method notifies the one or more online meeting participants when a disconnected participant is expected to return online and updates the online meeting agenda if the disconnected participant's reconnection time exceeds a predefined threshold.

17 Claims, 3 Drawing Sheets

SMARTER COLLABORATIVE CONFERENCES

BACKGROUND

The present disclosure relates generally to the field of cognitive computing and more particularly to predictive artificial intelligence (AI) models in online meeting platforms.

The time has come to take the online meeting technologies to the next level. Remote workspaces have become more common nowadays, and more businesses have come to rely on the stability of the online meeting tools, as well as the presence of the individual attendees, especially when they are expected to play a key role in the online meeting.

Given the variety of remote workspaces, it is inevitable that individual networks, workstations, and computing environments may experience a glitch occasionally. However, once the key attendee, or moderator, goes offline, the unpredictability of the next step in the online meeting lingers. When is the individual going to reconnect? Should the meeting pause until the moderator returns? If so, for how long?

Meeting disruptions due to lost connectivity cost companies a lot of wasted time and money.

Collaborative online meeting platforms currently lack the ability to guide meeting participants with a level of predictability towards reconnection of a disconnected participant.

BRIEF SUMMARY

Embodiments of the present invention disclose a method, a computer program product, and a system, for automatically recommending an online meeting reconnection time for one or more online meeting participants that are disconnected.

According to an embodiment, the method collects disconnection information for one or more online meeting participants over time as historical data. The method further constructs a predictive model for the one or more online meeting participants based on the historical data. The method further predicts a reconnection time for the one or more online meeting participants based on the predictive model and notifies the one or more online meeting participants when a disconnected participant is expected to return online.

A computer program product, according to an embodiment of the invention, includes a non-transitory tangible storage device having program code embodied therewith. The program code is executable by a processor of a computer to perform a method. The method collects disconnection information for one or more online meeting participants over time as historical data. The method further constructs a predictive model for the one or more online meeting participants based on the historical data. The method further predicts a reconnection time for the one or more online meeting participants based on the predictive model and notifies the one or more online meeting participants when a disconnected participant is expected to return online.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method collects disconnection information for one or more online meeting participants over time as historical data. The method further constructs a predictive model for the one or more online meeting participants based on the historical data. The method further predicts a reconnection time for the one or more online meeting participants based on the predictive model and notifies the one or more online meeting participants when a disconnected participant is expected to return online.

DETAILED DESCRIPTION

Figure 1:
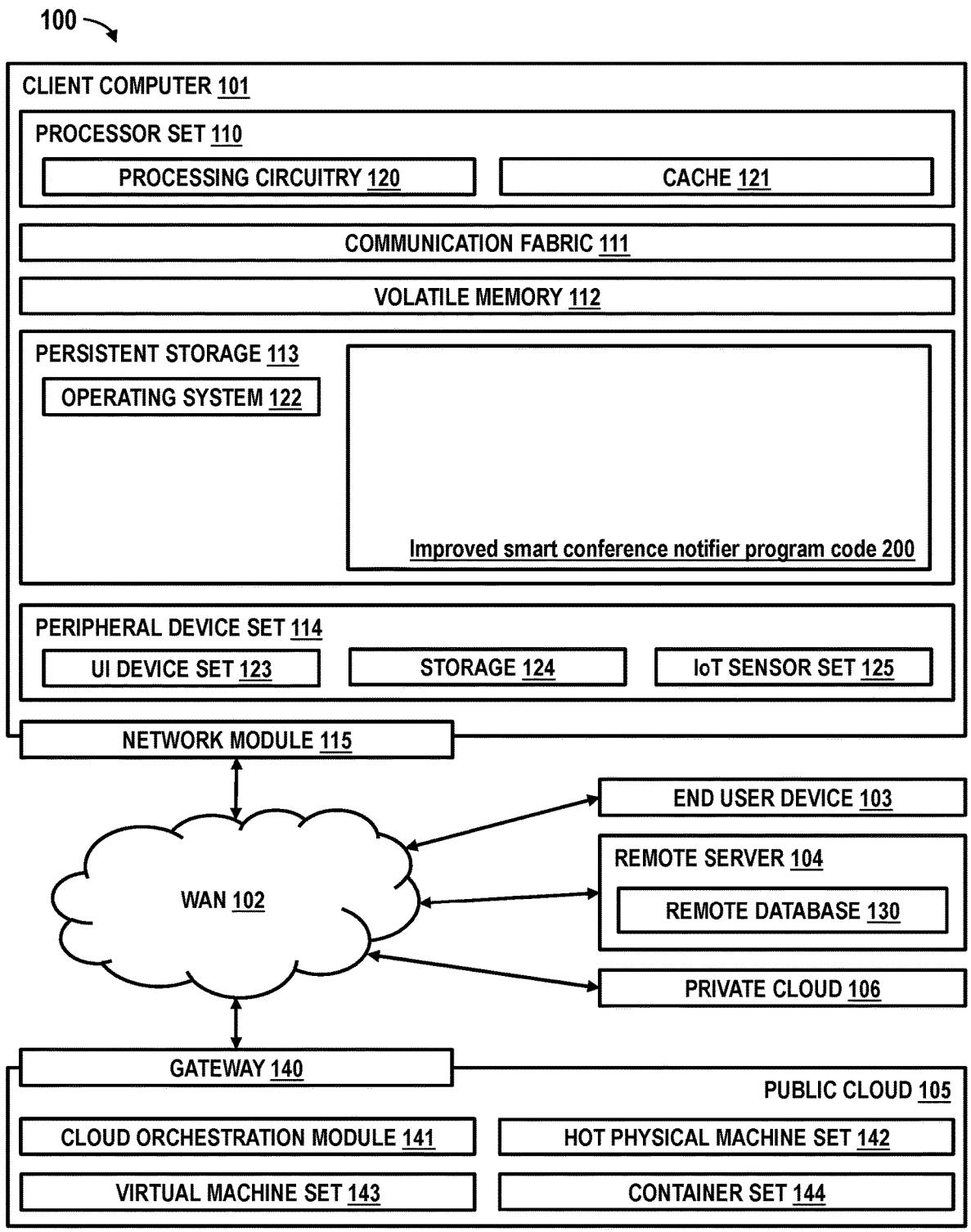
FIG. 1 depicts a diagram graphically illustrating the hardware components of smart conference notifier computing environment 100 and a cloud computing environment, in accordance with an embodiment of the present invention.

The present invention discloses a method for automatically recommending an online meeting reconnection time for one or more online meeting participants that are disconnected.

The present invention includes two main facets: (1) a method for online meeting participants to be guided with a level of predictability towards reconnection by recommending each disconnecting participant's reconnection span; and (2) a method for a user interface presentation to attempt to keep the rest of the online meeting participants informed of the likelihood, or timeline, of the disconnected participant's reconnection time.

As such, the present invention calculates meeting participants' reconnection spans in real-time from their individual profiles and calculates the maximum reconnection time per participant.

Nowadays, more and more businesses rely on a consistent meeting platform to conduct day to day meetings and keep their teams and business connected and in-sync.

However, unexpected glitches and lost connections of meeting attendees may create delays and unpredictability in collaborate online team meetings. Without knowing if, and when, a dropped attendee is going to return to the online meeting, the meeting's agenda is thrown off course and everyone's time is not utilized to its maximum potential.

For example, if the internet connection for one of the attendees during an online meeting suddenly fails or the attendee gets disconnected from the audio during the meeting, other attendees may become confused whether the disconnected attended was in direct conversation with anyone else in the meeting. An attendee, or meeting participant, may get disconnected for various reasons, leaving other attendees wondering when the disconnected attendee will rejoin.

Collaborate conference platform users and hosts must opt-in for the present invention to record users' interactions and to collect connection, and disconnection, information about a user from online collaborative meetings.

An example use case may better illustrate the present invention: Walter is attending a daily team meeting on the collaborative meeting platform. In the mornings, there are sometimes power outages in Walter's geographic location, and he usually gets disconnected from the meeting and reconnected from his mobile data. Other participants may not be aware of these power outage incidents. If Walter had the present invention enabled, the other meeting participants would get a pop-up message on the online meeting platform when he gets disconnected saying, "Walter is disconnected due to a power outage in his area and he will be rejoining in 10 seconds."

In the above example, the other meeting participants are guided with a level of predictability that allows for them to confidently wait an additional 10 seconds for Walter's return, instead of wondering how long Walter will be disconnected and contemplating whether to move on with the meeting agenda or not.

Hereinafter, exemplary embodiments of the present invention will be described in detail with reference to the attached drawings.

The present invention is not limited to the exemplary embodiments below but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of augmented virtual office layout computing environment 100 and a cloud computing environment in accordance with an embodiment of the present invention.

Augmented virtual office layout computing environment 100 contains an example of an environment for the execution of at least some of the computer code involved in performing the inventive methods, such as improved smart conference notifier program code 200. In addition to improved smart conference notifier program code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
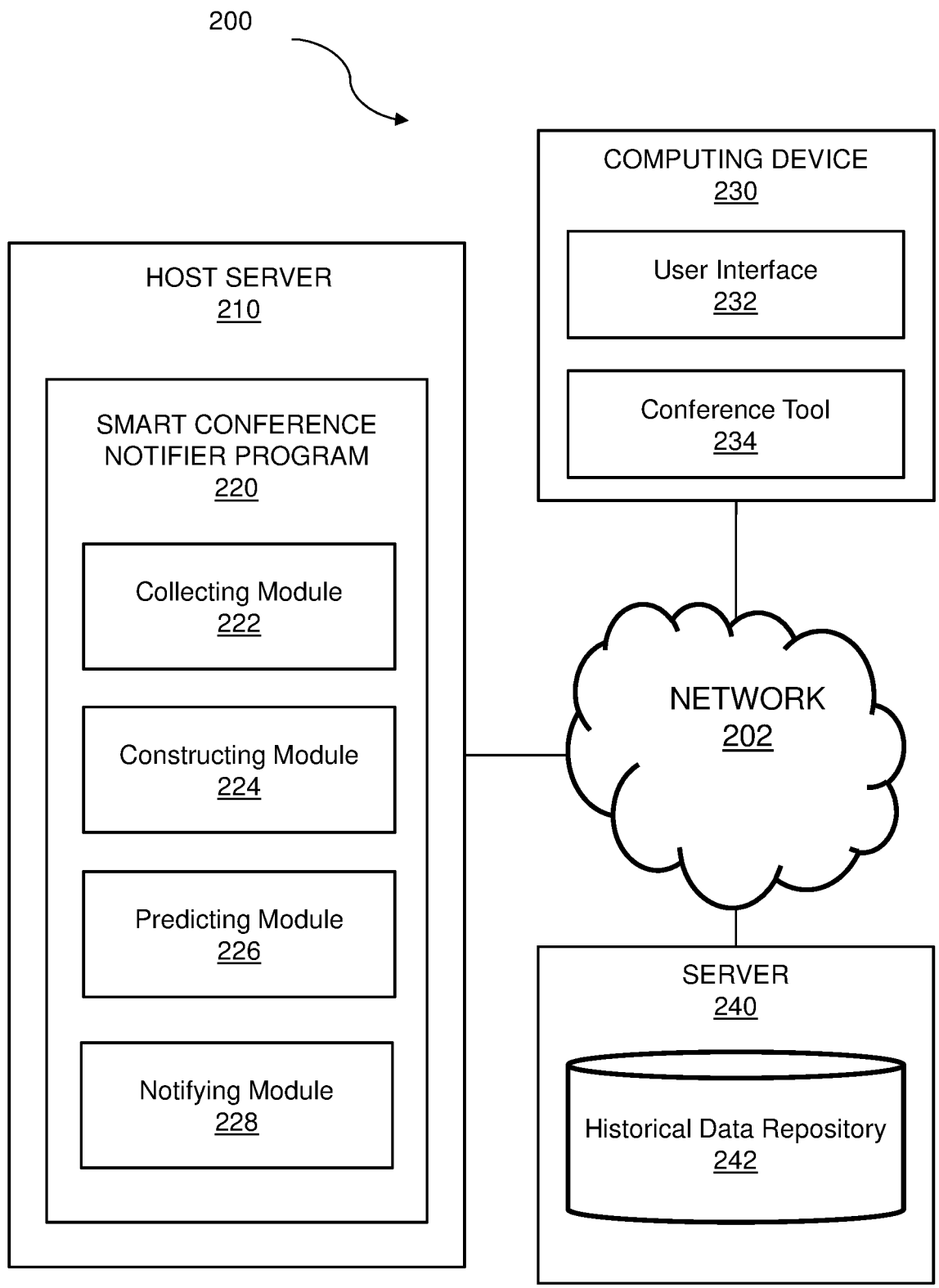
FIG. 2 illustrates smart conference notifier computing environment 200, in accordance with an embodiment of the present invention.

FIG. 2 illustrates smart conference notifier computing environment 200, in accordance with an embodiment of the present invention. Smart conference notifier computing environment 200 includes host server 210, computing device 230, and server 240 all connected via network 202. The setup in FIG. 2 represents an example embodiment configuration for the present invention and is not limited to the depicted setup to derive benefit from the present invention.

In an exemplary embodiment, host server 210 includes smart conference notifier program 220. In various embodiments, host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202. Host server 210 may include internal and external hardware components, as depicted, and described in further detail with reference to FIG. 1. In other embodiments, host server 210 may be implemented in a cloud computing environment, as further described in relation to FIG. 1 herein. Host server 210 may also have wireless connectivity capabilities allowing it to communicate with computing device 230, server 240, and other computers or servers over network 202.

With continued reference to FIG. 2, computing device 230 includes user interface 232 and conference tool 234 and may be a laptop computer, tablet computer, netbook computer, personal computer (PC), a desktop computer, a personal digital assistant (PDA), a smart phone, or any programmable electronic device capable of communicating with host server 210 and server 240 via network 202. Computing device 230 may include internal and external hardware components, as depicted, and described in further detail below with reference to FIG. 1. In other embodiments, computing device 230 may be implemented in a cloud computing environment, as described in relation to FIG. 1, herein.

In exemplary embodiments, user interface 232 is a computer program which allows a user to interact with computing device 230 and other connected devices via network 202. For example, user interface 232 may be a graphical user interface (GUI). In addition to comprising a computer program, user interface 232 may be connectively coupled to hardware components, such as those depicted in FIG. 1, for receiving user input. In an exemplary embodiment, user interface 232 may be a web browser, however in other embodiments user interface 232 may be a different program capable of receiving user interaction and communicating with other devices.

In exemplary embodiments, conference tool 234 may be a cloud-based video-conferencing application for a business or personal use that enables global and virtual teams to collaborate on mobile devices and standards-based video systems in real time. Conference tool 234 may have the ability to collect and save user information, conference events, technical issues for various users while using the conference tool 234, disconnection events, reconnection events, and a time span between a disconnection event and a reconnection event for various users.

With continued reference to FIG. 2, server 240 comprises historical data repository 242 and may be a laptop computer, tablet computer, netbook computer, personal computer (PC), a desktop computer, a personal digital assistant (PDA), a smart phone, or any programmable electronic device capable of communicating with host server 210 and computing device 230 via network 202.

In exemplary embodiments historical data repository 242 comprises user information, conference events, technical issues for various users while using the conference tool 234, disconnection events, reconnection events, and a time span between a disconnection event and a reconnection event for various users. Historical data repository 242 may further save each disconnect and reconnect incident for one or more users, the disconnection type (e.g., power outage, lost audio, server is down, etc.), and reconnection time (e.g., 10 seconds, 5 minutes, etc.).

Historical data repository 242 further includes user preferences with regards to opt-in and opt-out information. A user must opt-in for their information to be collected and saved in historical data repository 242.

With continued reference to FIG. 2, host server 210 includes smart conference notifier program 220. Host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202.

Smart conference notifier program 220 predicts the reconnection for a participant, or user, when they are disconnected from an online collaborative meeting and checks their historical data in historical data repository 242.

With continued reference to FIG. 2, smart conference notifier program 220, in an exemplary embodiment, may be a computer application on host server 210 that contains instruction sets, executable by a processor. The instruction sets may be described using a set of functional modules. In exemplary embodiments, smart conference notifier program 220 may receive input from computing device 230 and server 240 over network 202. In alternative embodiments, smart conference notifier program 220 may be a computer application on computing device 230, or a standalone program on a separate electronic device.

With continued reference to FIG. 2, the functional modules of smart conference notifier program 220 include collecting module 222, constructing module 224, predicting module 226, and notifying module 228.

Figure 3:
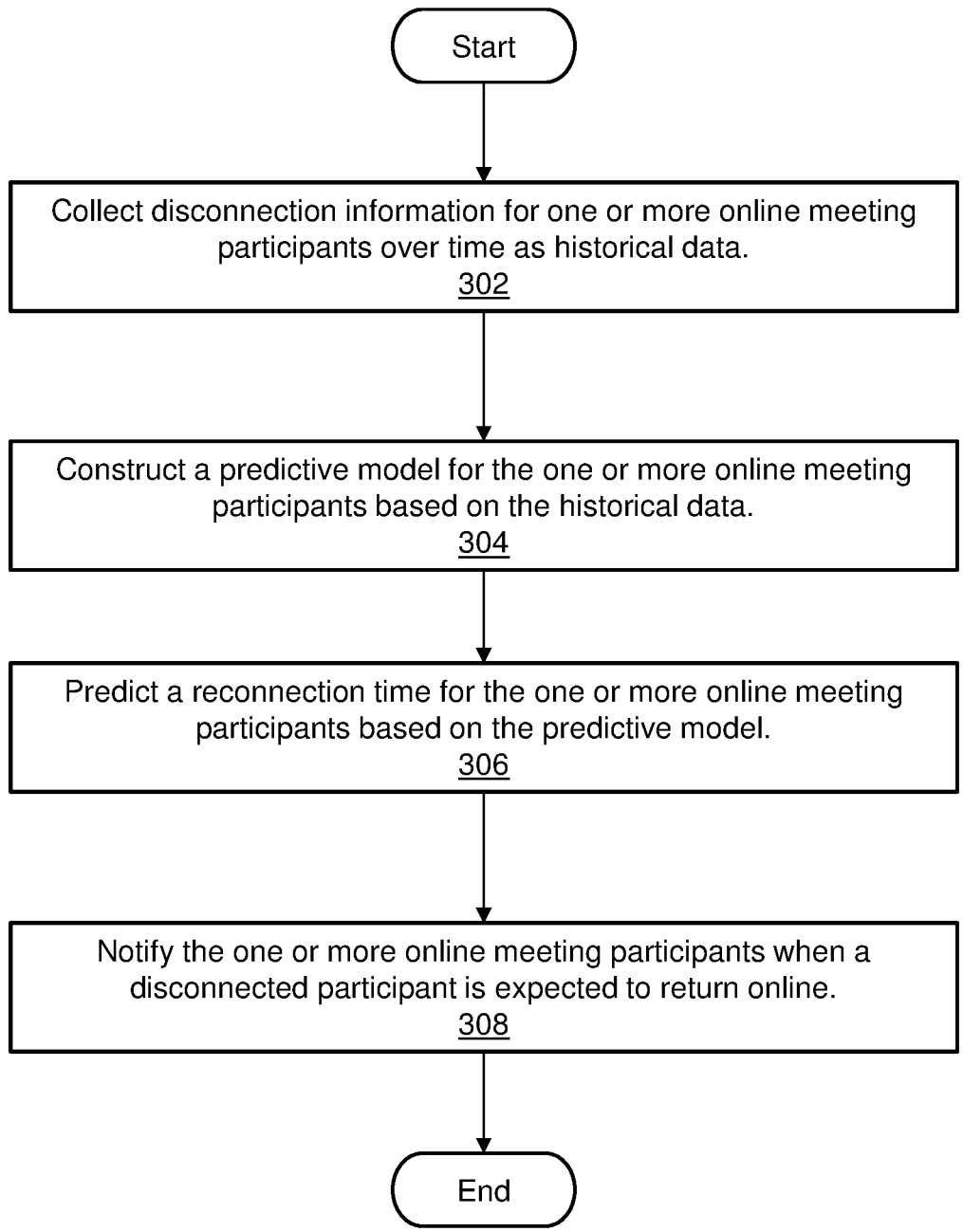
FIG. 3 is a flowchart illustrating the operation of smart conference notifier program 220 of FIG. 2, in accordance with an embodiment of the present invention.

FIG. 3 is a flowchart illustrating the operation of smart conference notifier program 220 of FIG. 2, in accordance with embodiments of the present disclosure.

With reference to FIGS. 2 and 3, collecting module 222 includes a set of programming instructions, in smart conference notifier program 220, to collect disconnection information for one or more online meeting participants over time as historical data (step 302). The set of programming instructions is executable by a processor.

There may be various reasons for a user to lose connection while participating in an online collaborative meeting. Some of the following reasons may explain a user's loss of connection to an online collaborative meeting: First, a user may lose their connection to the audio-only meeting platform, while remaining connected to the online meeting platform. Second, a user may get disconnected from the online meeting platform because of an internet connectivity issue. Third, a user may disconnect from their computer and join the online meeting from their mobile device. Fourth, a user may change from laptop audio to mobile device audio during the online meeting.

In exemplary embodiments, additional reasons why a user loses a connection while engaged with an online collaborative meeting are not limited to the examples provided herein, but may include additional technical, or non-technical issues, readily known to one of ordinary skill in the art.

With reference to an illustrative example, John is attending a daily team meeting on conference tool 234. John is presenting a slide deck to his team. He oftentimes faces connectivity issues with his audio while using the conference tool 234. When that happens, he rejoins with his mobile device audio. In this instance, John was in the middle of his presentation and suddenly, his audio went out. The other meeting participants were collectively confused and unsure of whether to wait for John to reconnect or move on to the next meeting agenda item. Luckily for John and his team, collecting module 222 has been collecting John's disconnection type and time, as well as reconnection time information over the last several months. This information is stored as historical data in historical data repository 242.

With continued reference to FIGS. 2 and 3, constructing module 234 includes a set of programming instructions in smart conference notifier program 220, to construct a predictive model for the one or more online meeting participants based on the historical data (step 304). The set of programming instructions is executable by a processor.

In exemplary embodiments, the historical data comprises a span of a reconnection time and a disconnection type, for the one or more online meeting participants.

Further, the predictive model utilizes artificial intelligence (AI) to predict a duration of a participant's reconnection time, by gathering and analyzing various user-related data derived from the historical data of the participant.

With continued reference to the illustrative example above, John has faced his connectivity issue on a consistent basis over the last several months. Constructing module 234 has constructed a predictive model based on John's historical data. For example, John's audio was disconnected last Monday and Tuesday at 10:15 am and 10:20 am, respectively. Additionally, in both instances, John reconnected to the online meeting with his mobile audio within 5 seconds and 10 seconds, respectively, of his disconnection.

With continued reference to FIGS. 2 and 3, predicting module 236 includes a set of programming instructions in smart conference notifier program 220, to predict a reconnection time for the one or more online meeting participants based on the predictive model (step 306). The set of programming instructions is executable by a processor.

In exemplary embodiments, predicting module 236 can inform the client when the server is back, for example, in case of a disconnection and would convey the same message to the online meeting participants.

In other embodiments, predicting module 236 checks the historical data (i.e., reason for disconnection, and length of time being disconnected) of the one or more online meeting participants once a disconnection takes place and displays an alert in the online meeting platform detailing why the participant is disconnected, together with an estimated reconnection time of the participant.

In further exemplary embodiments, predicting module 236 can adjust, in real-time, an online meeting agenda based on a disconnection event of the one or more online meeting participants and a predicted reconnection time, and update the online meeting agenda if the disconnected participant's reconnection time exceeds a predefined threshold.

In cases where predicting module 236 predicts a reconnection time that exceeds a predefined threshold (e.g., longer than the length of the scheduled online meeting), then predicting module 236 may choose an alternative connection type for the one or more online meeting participants and display the chosen alternative connection type in the online meeting platform. For example, an alternative connection type may be a personal hotspot, a different server, a mobile device, a laptop, or any other connection known to one of ordinary skill in the art.

With continued reference to the illustrative example above, predicting module 236 checks John's historical data upon realizing that John's audio has been disconnected from the online meeting. John has a track record of losing audio connectivity on average of 5-10 seconds at a certain time of the meeting. Predicting module 236 can calculate, based on John's track record, an estimated reconnection time.

With continued reference to FIGS. 2 and 3, notifying module 238 includes a set of programming instructions in smart conference notifier program 220, to notify the one or more online meeting participants when a disconnected participant is expected to return online (step 308). The set of programming instructions is executable by a processor.

In exemplary embodiments, notifying module 238 may include some of, but not limited to, the following notifications based on a meeting participant's disconnection from the meeting: (1) if the participant is still connected to the online meeting platform but disconnected from only the audio, an alert may pop up informing the online meeting participants that "Participant got disconnected from audio today and audio was back in 5 seconds"; (2) if the participant was disconnected from the online meeting platform due to internet issues, a notification may appear on the online platform informing the team that "Participant got disconnected from the online meeting platform and will be back within 8 seconds"; (3) if the participant got disconnected from laptop to mobile and re-joined right away, a pop-up message will appear stating "Participant got disconnected from his laptop (one device) and will join back right away from his mobile device (another device) in 5 seconds"; (4) if the participant changed his audio mode (e.g., from laptop to mobile device), a notification will pop-up stating "Participant disconnected from laptop audio (one audio option) and will reconnect with mobile audio (another audio option) in 6 seconds."

In other exemplary embodiments, notifying module 228 may automatically notify the one or more online meeting participants of a user's disconnection type and time, together with an anticipated reconnection type and time, based on the historical data of the user.

With continued reference to the illustrative example above, John's team is alerted to his disconnection and estimated reconnection time by receiving a pop-up alert stating "John got disconnected from audio and will re-join audio with his mobile device in 5 seconds."

In another illustrative example, David is presenting a product review on an online meeting call. Sometimes, David gets disconnected due to intermittent WiFi connection issues. When he gets disconnected, David must restart the WiFi. Now, seconds before his presentation is set to begin, David gets disconnected and now all the other meeting participants are waiting for him. The other participants are unsure what happened, and if/when David will reconnect to the online meeting platform. If David had the present invention enabled, the host and other meeting participants would receive a pop-up alert, when David got disconnected, stating "David's WiFi got disconnected and he will be rejoining the meeting in 2 minutes." Furthermore, based on the alert to the group, the meeting agenda could have been re-arranged and the other meeting participants need not waste their valuable time waiting for David to reconnect.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, computing device 230, and server 240.

The invention claimed is:

1. A computer-implemented method for automatically recommending an online meeting reconnection time for one or more online meeting participants that are disconnected, comprising:
   collecting disconnection information for one or more online meeting participants over time as historical data;
   constructing a predictive model for the one or more online meeting participants based on the historical data;
   predicting a reconnection time for the one or more online meeting participants based on the predictive model; and
   automatically notifying the one or more online meeting participants of a user's disconnection type and time, together with an anticipated reconnection type and time, based on the historical data of the user.

2. The computer-implemented method of claim 1, wherein the historical data comprises a span of a reconnection time and a disconnection type, for the one or more online meeting participants.

3. The computer-implemented method of claim 2, wherein the predictive model utilizes artificial intelligence (AI) to predict a duration of a participant's reconnection time, by gathering and analyzing various user-related data derived from the historical data of the participant.

4. The computer-implemented method of claim 1, further comprising:
   adjusting, in real-time, an online meeting agenda based on a disconnection event of the one or more online meeting participants and a predicted reconnection time; and
   updating the online meeting agenda if the disconnected participant's reconnection time exceeds a predefined threshold.

5. The computer-implemented method of claim 1, further comprising:
   checking the historical data of the one or more online meeting participants once a disconnection takes place; and
   displaying an alert in the online meeting platform detailing why the participant is disconnected, together with an estimated reconnection time of the participant.

6. The computer-implemented method of claim 1, further comprising:
   choosing an alternative connection type for the one or more online meeting participants; and
   displaying the chosen alternative connection type in the online meeting platform.

7. A computer program product for implementing a program that manages a device, comprising a non-transitory tangible storage device having program code embodied therewith, the program code executable by a processor of a computer to perform a method, the method comprising:
   collecting disconnection information for one or more online meeting participants over time as historical data;
   constructing a predictive model for the one or more online meeting participants based on the historical data;
   predicting a reconnection time for the one or more online meeting participants based on the predictive model; and automatically notifying the one or more online meeting participants of a user's disconnection type and time, together with an anticipated reconnection type and time, based on the historical data of the user.

8. The computer program product of claim 7, wherein the historical data comprises a span of a reconnection time and a disconnection type, for the one or more online meeting participants.

9. The computer program product of claim 8, wherein the predictive model utilizes artificial intelligence (AI) to predict a duration of a participant's reconnection time, by gathering and analyzing various user-related data derived from the historical data of the participant.

10. The computer program product of claim 7, further comprising:
  adjusting, in real-time, an online meeting agenda based on a disconnection event of the one or more online meeting participants and a predicted reconnection time; and
  updating the online meeting agenda if the disconnected participant's reconnection time exceeds a predefined threshold.

11. The computer program product of claim 7, further comprising:
  checking the historical data of the one or more online meeting participants once a disconnection takes place; and
  displaying an alert in the online meeting platform detailing why the participant is disconnected, together with an estimated reconnection time of the participant.

12. The computer program product of claim 7, further comprising:
  choosing an alternative connection type for the one or more online meeting participants; and
  displaying the chosen alternative connection type in the online meeting platform.

13. A computer system for implementing a program that manages a device, comprising:
  one or more computer devices each having one or more processors and one or more tangible storage devices; and a program embodied on at least one of the one or more storage devices, the program having a plurality of program instructions for execution by the one or more processors, the program instructions comprising instructions for:
    collecting disconnection information for one or more online meeting participants over time as historical data;
    constructing a predictive model for the one or more online meeting participants based on the historical data;
    predicting a reconnection time for the one or more online meeting participants based on the predictive model; and
    automatically notifying the one or more online meeting participants of a user's disconnection type and time, together with an anticipated reconnection type and time, based on the historical data of the user.

14. The computer system of claim 13, wherein the historical data comprises a span of a reconnection time and a disconnection type, for the one or more online meeting participants.

15. The computer system of claim 14, wherein the predictive model utilizes artificial intelligence (AI) to predict a duration of a participant's reconnection time, by gathering and analyzing various user-related data derived from the historical data of the participant.

16. The computer system of claim 13, further comprising:
  adjusting, in real-time, an online meeting agenda based on a disconnection event of the one or more online meeting participants and a predicted reconnection time; and
  updating the online meeting agenda if the disconnected participant's reconnection time exceeds a predefined threshold.

17. The computer system of claim 13, further comprising:
  checking the historical data of the one or more online meeting participants once a disconnection takes place; and
  displaying an alert in the online meeting platform detailing why the participant is disconnected, together with an estimated reconnection time of the participant.

* * * * *